United States Patent
Wu

(10) Patent No.: US 9,026,695 B2
(45) Date of Patent: May 5, 2015

(54) ASYMMETRICAL PROCESSING MULTI-CORE SYSTEM AND NETWORK DEVICE

(71) Applicant: Gemtek Technology Co., Ltd., Hsinchu (TW)

(72) Inventor: Pei-Lin Wu, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 2 days.

(21) Appl. No.: 13/747,487

(22) Filed: Jan. 23, 2013

(65) Prior Publication Data

US 2014/0164654 A1    Jun. 12, 2014

(30) Foreign Application Priority Data

Dec. 11, 2012  (TW) .............................. 101146705 A

(51) Int. Cl.
| | | |
|---|---|---|
| G06F 3/00 | (2006.01) | |
| G06F 13/00 | (2006.01) | |
| G06F 5/00 | (2006.01) | |
| G06F 13/28 | (2006.01) | |
| G06F 5/10 | (2006.01) | |

(52) U.S. Cl.
CPC ........................................ G06F 5/10 (2013.01)

(58) Field of Classification Search
CPC ... G06F 15/17381; G06F 1/12; G06F 9/5061; G06F 11/0724; G06F 13/385; G06F 13/387; G06F 15/16; G06F 15/17; G06F 9/5088; G06F 11/2005; G06F 11/3433; G06F 9/45558; G06F 9/5016; G06F 9/505; G06F 9/5077; G06F 9/542

USPC ............ 710/54, 33, 52, 22, 26; 711/173, 119, 711/147, 6, 122, 153; 709/217; 370/235, 370/363

See application file for complete search history.

(56) References Cited

U.S. PATENT DOCUMENTS

| | | | | |
|---|---|---|---|---|
| 6,049,854 | A  * | 4/2000 | Bedarida ........................ | 711/153 |
| 7,047,368 | B2 * | 5/2006 | Vantalon et al. ............... | 711/147 |
| 7,292,567 | B2 * | 11/2007 | Terrell et al. ................... | 370/363 |
| 7,779,205 | B2 * | 8/2010 | Hoogerbrugge .............. | 711/119 |
| 8,161,482 | B1 | 4/2012 | Sakarda | |

(Continued)

FOREIGN PATENT DOCUMENTS

| | | |
|---|---|---|
| CN | 101727351 | 6/2010 |
| TW | 200802098 | 1/2008 |

OTHER PUBLICATIONS

"Office Action of Taiwan Counterpart Application", issued on Oct. 23, 2014, p. 1-p. 6.

*Primary Examiner* — Farley Abad
*Assistant Examiner* — Henry Yu
(74) *Attorney, Agent, or Firm* — Jianq Chyun IP Office

(57) ABSTRACT

An asymmetrical processing multi-core system used in a network device is provided. A sub processing core within the asymmetrical processing multi-core system facilitates a main processing core of the asymmetrical processing multi-core system in processing tasks, thereby improving an overall performance of the entire network device and causing the network device to operate more facilely. Different from a conventional processing method, the asymmetrical processing multi-core system does not require moving or copying a large amount of processed packet data, and thus a large amount of memory bandwidth is saved and the power consumption is reduced.

16 Claims, 10 Drawing Sheets

(56) References Cited

U.S. PATENT DOCUMENTS

| | | | |
|---|---|---|---|
| 8,244,933 B1* | 8/2012 | New | 710/33 |
| 8,566,487 B2* | 10/2013 | Ekner | 710/52 |
| 8,635,412 B1* | 1/2014 | Wilshire | 711/147 |
| 2002/0198908 A1* | 12/2002 | Hartel | 707/513 |
| 2003/0119475 A1* | 6/2003 | Choi | 455/403 |
| 2004/0249995 A1* | 12/2004 | Day et al. | 710/22 |
| 2006/0080398 A1* | 4/2006 | Hoover et al. | 709/213 |
| 2007/0043964 A1* | 2/2007 | Lim et al. | 713/322 |
| 2007/0255802 A1* | 11/2007 | Aloni et al. | 709/217 |
| 2008/0198748 A1* | 8/2008 | Gilfix et al. | 370/235 |
| 2009/0007117 A1 | 1/2009 | Cho | |
| 2009/0172431 A1* | 7/2009 | Gupta et al. | 713/320 |
| 2012/0030407 A1* | 2/2012 | Pandey et al. | 711/6 |
| 2013/0138841 A1* | 5/2013 | Xu et al. | 710/26 |
| 2013/0227243 A1* | 8/2013 | Garg | 711/173 |
| 2014/0281243 A1* | 9/2014 | Shalf et al. | 711/122 |

\* cited by examiner

ASYMMETRICAL PROCESSING MULTI-CORE SYSTEM AND NETWORK DEVICE

CROSS-REFERENCE TO RELATED APPLICATION

This application claims the priority benefit of Taiwan application serial no. 101146705, filed on Dec. 11, 2012. The entirety of the above-mentioned patent application is hereby incorporated by reference herein and made a part of this specification.

BACKGROUND

1. Field of the Application

The invention relates to an asymmetrical processing multi-core system, and more particularly, to an asymmetrical processing multi-core system that does not require copying or moving a large amount of data stored in a memory, and a network device having this asymmetrical processing multi-core system.

2. Description of Related Art

Following advances in process technology and chip design technology, currently many network devices are all equipped with multiple processing cores in order to rapidly process a plurality of packets that are to be sent or received. Generally, the most commonly seen is the network device with an asymmetric processing dual-core system. The so-called asymmetric processing refers to two or more processing cores having different processing capabilities, wherein one processing core may have faster processing speed and larger power consumption while the other processing core may have slower processing speed and lower power consumption.

Under the network device with the asymmetric processing dual-core system, the different processing cores are executing their respective operating systems; and therefore, in order to make the two processing cores in to collaboration and attain a maximum network performance, it is necessary to plan a complete synchronization technique, so that the two processing cores may carry out their respective duties.

Referring to FIG. 1, FIG. 1 is a block diagram of a conventional asymmetric processing dual-core system. An asymmetric processing dual-core system 10 includes a main processing core 10_Core0, a sub processing core 10_Core1, a register 10_Reg, a memory 10_Mem, a first peripheral device 10_Ph0 and a second peripheral device 10_Ph1. The first peripheral device 10_Ph0 and the second peripheral device 10_Ph1, in this example, are both Ethernet media access controllers (including a network layer, a media access control layer and a physical layer), and are both connected to an external exchange member 10_ExSw. Therefore, in this example, the asymmetric processing dual-core system 10 and the external exchange member 10_ExSw may form a network device. In addition, the first peripheral device 10_Ph0 and the second peripheral device 10_Ph1 may also be other types of peripheral device, such as a Universal Serial Bus (USB).

The main processing core 10_Core0 and the sub processing core 10_Core1 share the register 10_Reg and the memory 10_Mem, and the memory 10_Mem is being divided into three memory areas 10_Mem0, 10_MemS and 10_Mem1, wherein the memory area 10_MemS is shared by the main processing core 10_Core0 and the sub processing core 10_Core1, the memory areas 10_Mem0 and 10_Mem1 are respectively dedicated to the main processing core 10_Core0 and the sub processing core 10_Core1.

The main processing core 10_Core0 and the sub processing core 10_Core1 have different processing capabilities, and are respectively executing different operating systems. The sub processing core 10_Core1 shares a network processing job of the main processing core 10_Core0, so as to attain a maximum network performance.

A typical operating system generally has two position spaces, wherein one is a user space and the other one is a core space. The user space is configured to be accessed by a user, and a user program may be carefreely executed within the user space. The core space is configured to be executed and accessed by the operating system so as to provide an execution environment for the user program. An operating system OS0 of the main processing core $10_{13}$ Core0, for example, is a Windows operating system, and the Windows operating system, for example, has a core space 10_KS0 and a user space 10_US0. Similarly, an operating system OS1 of the sub processing core 10_Core1, for example, is a Linux operating system, and the Linux, for example, has a core space 10_KS1 and a user space 10_US1.

Conventionally, there are approximately two types of collaboration approach for the main processing core 10_Core0 and the sub processing core 10_Core1; and the following below respectively describes the two types of collaboration approach through FIGS. 2A and 2B.

Referring to FIG. 1 and FIG. 2A at the same time, FIG. 2A is a flow diagram illustrating a conventional collaboration approach of the dual-core system. Firstly, at step S20, the external exchange member 10_ExSw via the first peripheral device 10_Ph0 transmits the received packet to the main processing core 10_Core° to perform a first processing. Next, at step S21, the main processing core 10_Core0 performs the first processing to the packet. Then, at step S22, the main processing core 10_Core0 via the first peripheral device 10_Ph0 transmits the packet to the sub processing core 10_Core1, the external exchange member 10_ExSw and the second peripheral device 10_Ph1 to perform a second processing.

Afterward, in step S23, the sub processing core 10_Core1 performs the second processing to the packet. Then, at step S24, the sub processing core 10_Core1 via the second peripheral device 10_Ph1 transmits the packet to the main processing core 10_Core0, the external exchange member 10_ExSw and the first peripheral device 10_Ph0 to perform a last processing. Finally, at step S25, the main processing core 10_Core0 performs the last processing to the packet.

For instance, the main processing core 10_Core0 may be responsible for determining a packet routing, and the sub processing core 10_Core1 may be responsible for counting a packet amount or analyzing the packet type. The main processing core 10_Core0, after received the packet, may preliminarily perform an analysis on a destination address of the packet (same as the aforementioned first processing), the sub processing core 10_Core1 may count the packet amount or analyze the packet type, and finally the main processing core 10_Core0 may determine the packet routing according to the destination address of the packet and the packet type (same as the aforementioned final processing).

Referring to FIG. 1 and FIG. 2B at the same time, FIG. 2B is a flow diagram illustrating another conventional collaboration approach of the dual-core system. Firstly, at step S30, the external exchange member 10_ExSw via the first peripheral device 10_Ph0 transmits the received packet to the main processing core 10_Core0 to perform the first processing. Next, at step S31, the main processing core 10_Core0 performs the first processing to the packet and stores the packet in the memory area 10_MemS. Afterward, at step S32, the main processing core 10_Core0 via a communication interface (not shown in FIG. 1) notifies the sub processing core 10_Core1 to perform the second processing to the packet.

Then, as step S33, the sub processing core 10_Core1 read accesses the packet from the memory area 10_MemS. Afterward, at step S34, the sub processing core 10_Core1 performs the second processing to the packet and stores the packet in the memory area 10_MemS. Next, at step S35, the sub processing core 10_Core1 via the communication interface notifies the main processing core 10_Core0 to perform the final processing to the packet. Then, at step S36, the main processing core 10_Core0 read accesses the packet from the memory area 10_MemS. Finally, at step S37, the main processing core 10_Core0 performs the final processing to the packet.

For instance, the main processing core 10_Core0 may be responsible for determining a packet routing, and the sub processing core 10_Core1 may be responsible for counting a packet amount or analyzing the packet type. The main processing core 10_Core0, after received the packet, may preliminarily perform an analysis on a destination address of the packet (same as the aforementioned first processing), the sub processing core 10_Core1 may count the packet amount or analyze the packet type, and finally the main processing core 10_Core0 may determine the packet routing according to the destination address of the packet and the packet type (same as the aforementioned second processing) and finally the main processing core 10_Core0 may determine the packet routing according to the destination address of the packet and the packet type (same as the aforementioned final processing).

In general, most Internet applications programs are executed within the user space, and therefore, the main processing core 10_Core0, when performing the first processing or the final processing to the packet each time, must move or copy the packet stored within the core space 10_KS0 into the user space 10_US0 via a memory copy method. Similarly, the sub processing core 10_Core1, when performing the second processing to the packet each time, also must move or copy the packet stored within the core space 10_KS1 into the user space 10_US1 via the memory copy method.

In terms of the approach illustrated in FIG. 2A, a memory area of the packet stored in the user space 10_US0 is in the memory area 10_Mem0 that dedicated to the main processing core 10_Core0, and when the sub processing core 10_Core1 is to process the packet, the packet stored within the memory area 10_Mem0 is copied or moved into the user space 10_US1 after firstly being copied or moved to the core space 10_KS1, so that the sub processing core 10_Core1 can perform the second processing to the packet.

In terms of the approach illustrated in FIG. 2B, a memory area of the packet stored within the user space 10_US0 is in the memory area 10_MemS, and when the sub processing core 10_Core1 is to process the packet, packet within the memory area 10_MemS is copied or moved into the user space 10_US1 after firstly being copied or moved to the core space 10_KS1, so that the sub processing core 10_Core1 can perform the second processing to the packet.

The approach illustrated in FIG. 2A has to transfer the packet via the first peripheral device 10_Ph0, the external exchange member 10_ExSw and the second peripheral device 10_Ph1, and an efficiency and a performance thereof is apparently poorer than the approach illustrated in FIG. 2B. Although an efficiency of the approach illustrated in FIG. 2B is better than that of the approach illustrated in FIG. 2A, the approaches of FIG. 2A and FIG. 2B are both indeed require to move or copy a large amount of packet data, thereby wasting a bandwidth of the memory 10_Mem. In addition, continuously moving the data of the memory 10_Mem via the main or the sub processing cores 10_Core0, 10_Core1 would also result in more power consumption.

SUMMARY OF THE APPLICATION

One embodiment of the invention provides an asymmetrical processing multi-core system, and the asymmetrical processing multi-core system includes a main processing core, a sub processing core, a register, a memory, a first peripheral device and a second peripheral device. The main processing core has a first operation system, the first operation system includes a first core space and a first user space, the first core space includes an Ethernet driver module and a receiving end queue management module, and the first user space includes a first control management module. The sub processing core has a second operation system, the second operation system includes a second core space and a second user space, and the second user space includes a second control management module. The register is shared by the main processing core and the sub processing core. The memory has a first memory area utilizable by the main processing core. The first peripheral device is connected to the main processing core and the external exchange member. The second peripheral device is connected to the sub processing core and the external exchange member. The Ethernet driver module receives a packet from the external exchange member via the first peripheral device, the packet is stored by the receiving end queue management module at the first memory area; wherein the second control management module directly read accesses the packet data stored by the first memory area according to a memory absolute position and further processes the data packet to generate a processing result, and then the second control management module notifies the processing result to the receiving end queue management module. Later, the receiving end queue management module processes the packet according to the processing result.

One embodiment of the invention provides a network device including an asymmetrical processing multi-core system and an external exchange member. The asymmetrical processing multi-core system includes a main processing core, a sub processing core, a register, a memory, a first peripheral device and a second peripheral device. The main processing core has a first operation system, the first operation system includes a first core space and a first user space, the first core space includes an Ethernet driver module and a receiving end queue management module, and the first user space includes a first control management module. The sub processing core has a second operation system, the second operation system includes a second core space and a second user space, and the second user space includes a second control management module. The register is shared by the main processing core and the sub processing core. The memory has a first memory area utilizable by the main processing core. The first peripheral device is connected to the main processing core and the external exchange member. The second peripheral device is connected to the sub processing core and the external exchange member. The Ethernet driver module receives a packet from the external exchange member via the first peripheral device, the packet is stored by the receiving end queue management module at the first memory area; wherein the second control management module directly read accesses the packet data stored by the first memory area according to a memory absolute position and further processes the data packet to generate a processing result, and then the second control management module notifies the processing result to the receiving end queue management module. Later, the receiving end queue management module processes the packet according to the processing result.

According to the foregoing, the embodiment of the invention provides the asymmetrical processing multi-core system utilizable in the network device. The sub processing core within the asymmetrical processing multi-core system facilitates the main processing core in processing tasks, thereby improving an overall performance of the entire network device and causing the network device to operate more facilely. Different from a conventional processing method, the asymmetrical processing multi-core system does not require moving or copying a large amount of processed packet data, and thus a large amount of memory bandwidth is saved and the power consumption is reduced.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 3:
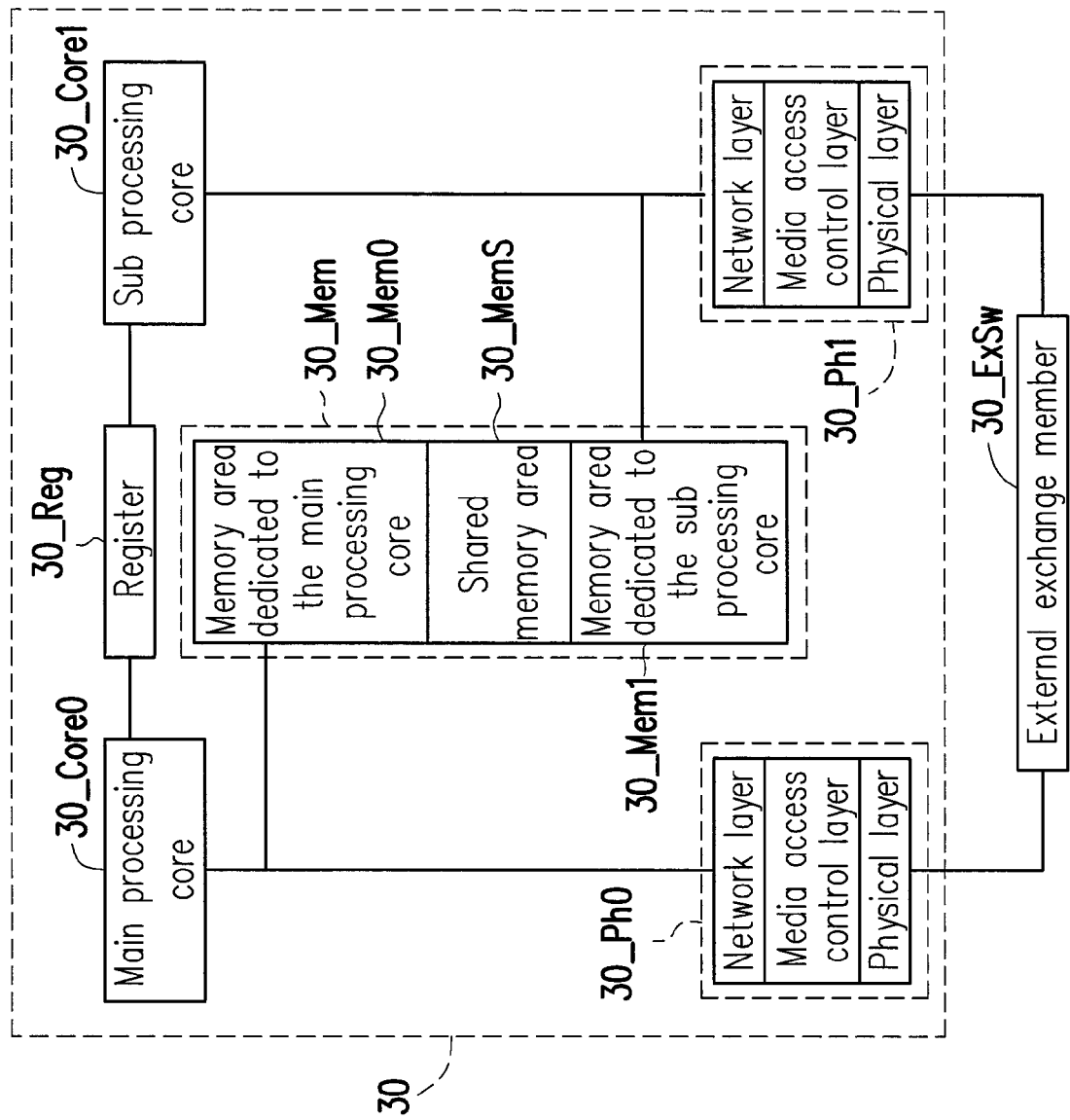
FIG. 3 is a block diagram of an asymmetric processing dual-core system according to an embodiment of the invention.

Referring to FIG. 3, FIG. 3 is a block diagram of an asymmetric processing dual-core system according to an embodiment of the invention. An asymmetric processing dual-core system 30 includes a main processing core 30_Core0, a sub processing core 30_Core1, a register 30_Reg, a memory 30_Mem having three memory areas (30 Mem0, 30 MemS and 30 Mem1), a first peripheral device 30_Ph0 and a second peripheral device 30_Ph1. The first peripheral device 30_Ph0 and the second peripheral device 30_Ph1, in this example, are both Ethernet media access controllers (including a network layer, a media access control layer and a physical layer), and are both connected to an external exchange member 30_ExSw. Therefore, in this example, the asymmetric processing dual-core system 30 and the external exchange member 30_ExSw may form a network device. In addition, the first peripheral device 30_Ph0 and the second peripheral device 30_Ph1 may also be other types of peripheral devices, such as Universal Serial Buses (USB).

Figure 1:
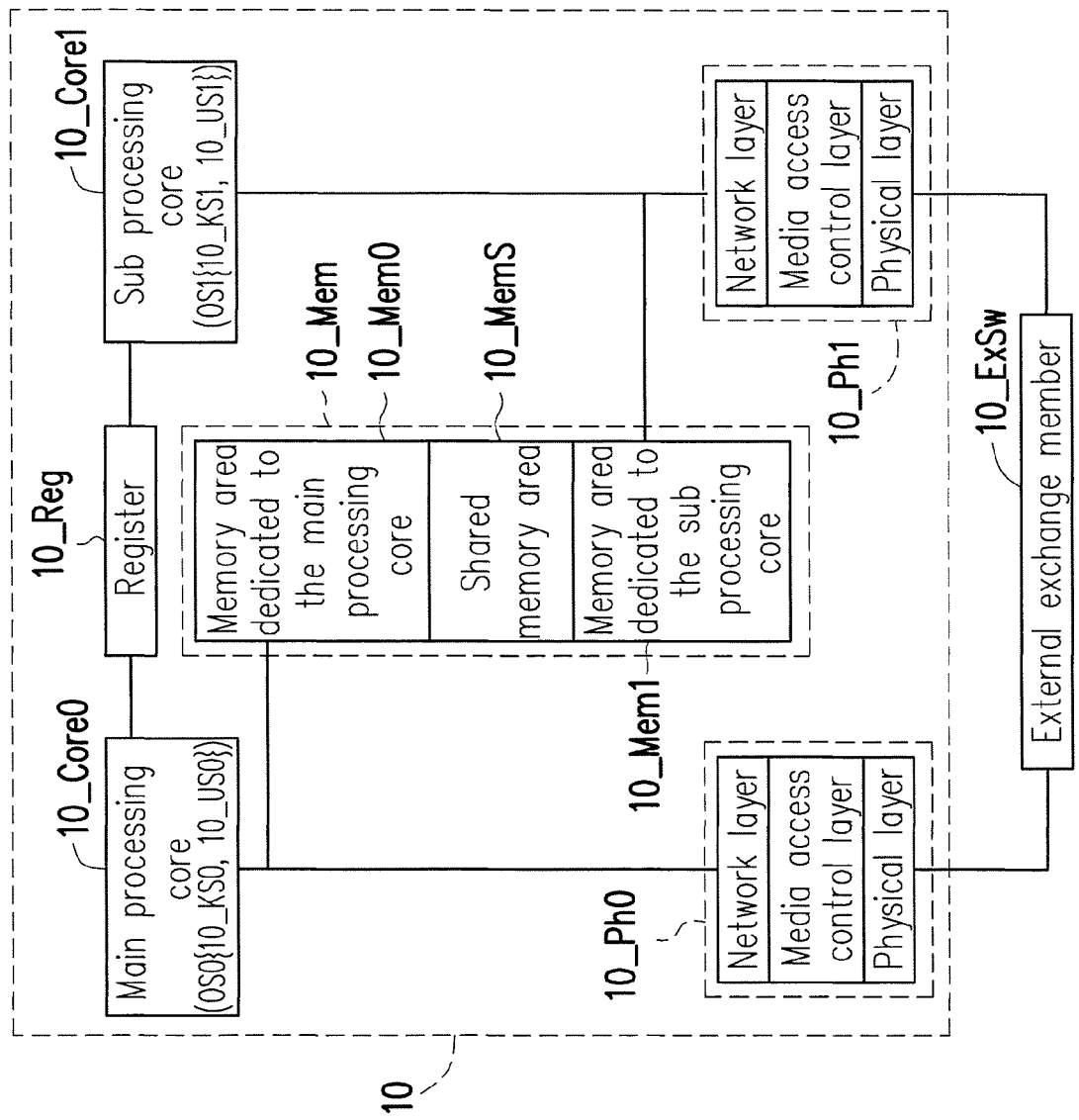
FIG. 1 is a block diagram of a conventional asymmetric processing dual-core system.
Figure 2A:
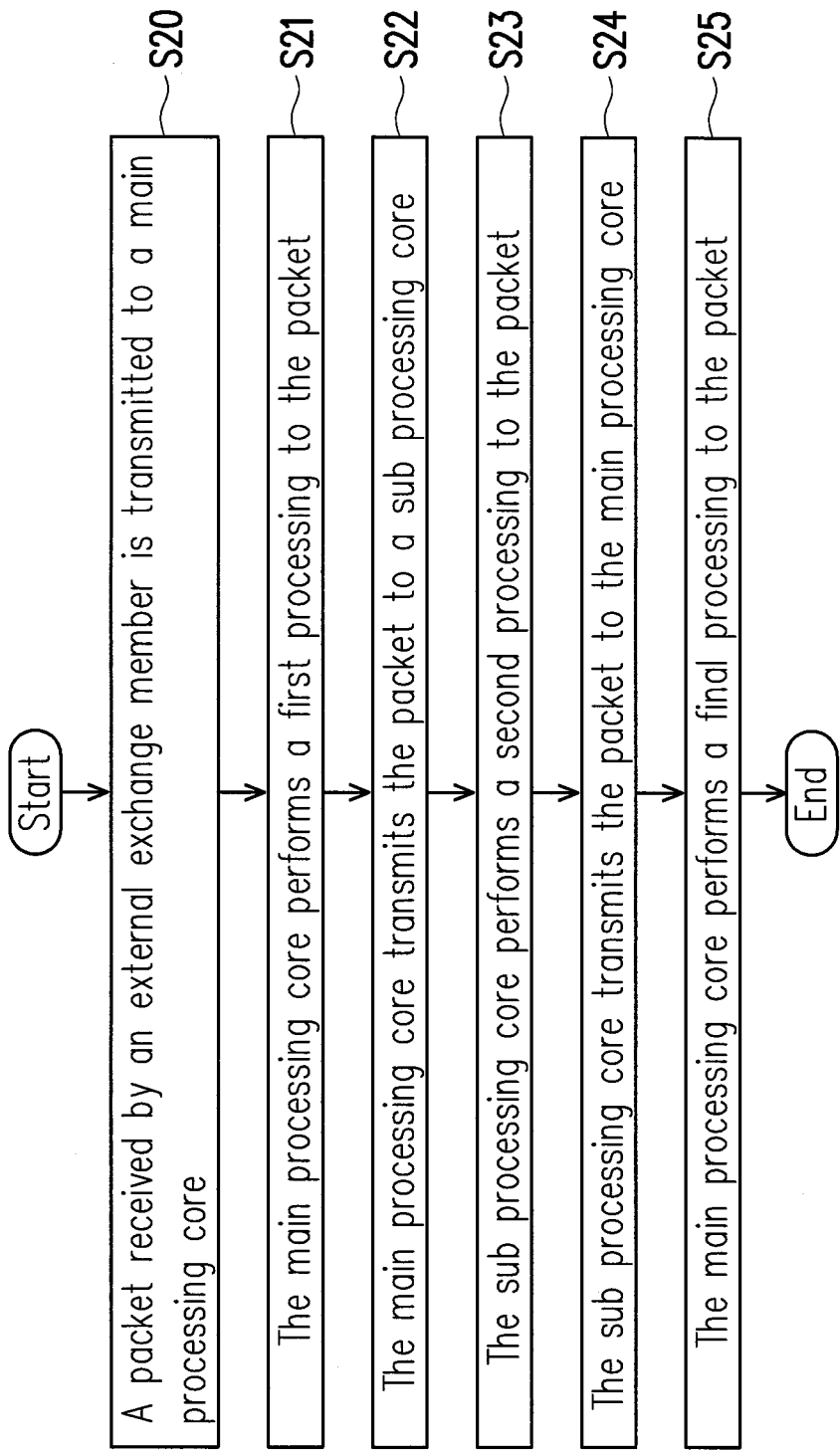
FIG. 2A is a flow diagram illustrating a conventional collaboration approach of the dual-core system.
Figure 2B:
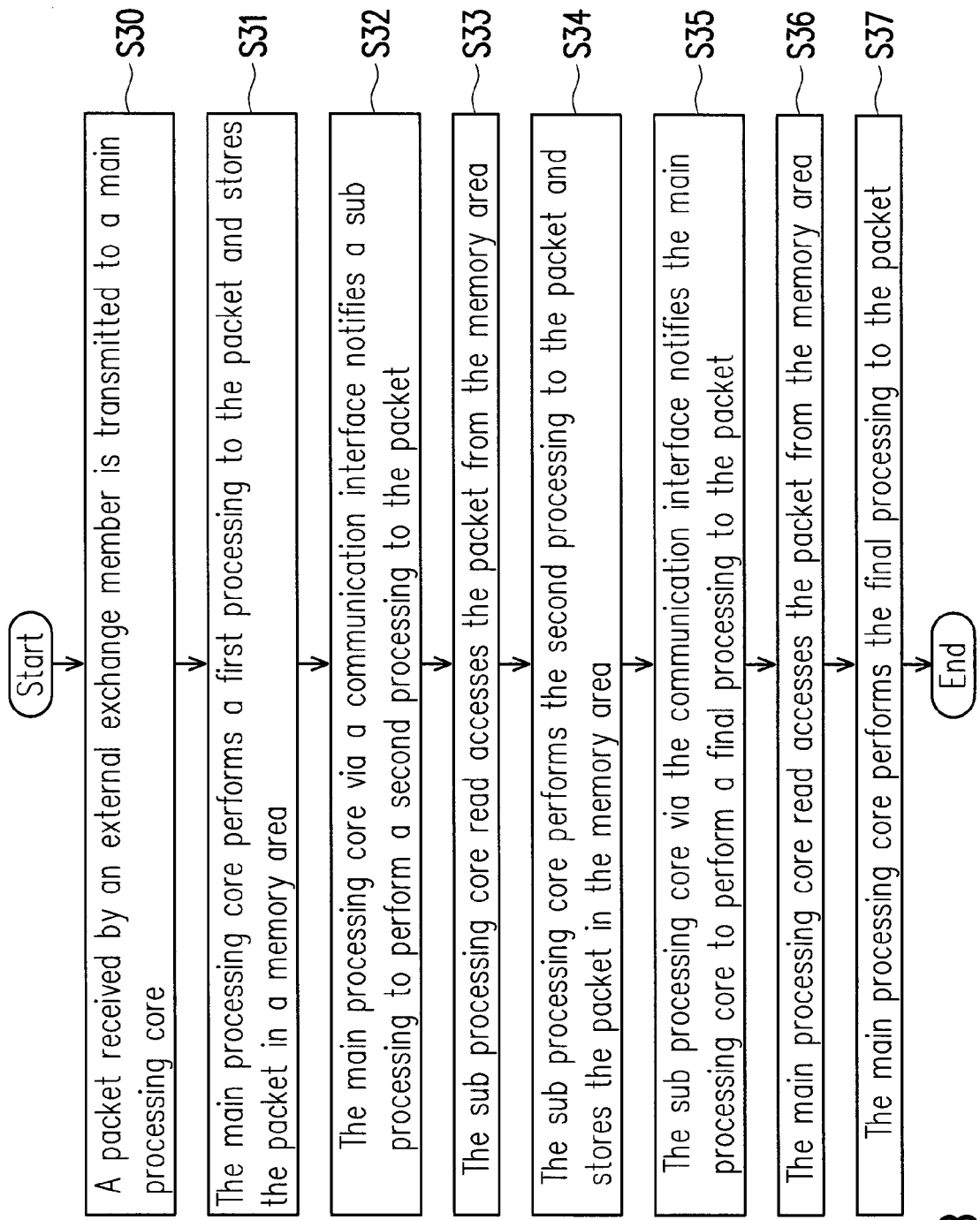
FIG. 2B is a flow diagram illustrating another conventional collaboration approach of the dual-core system.

A difference between the dual-core system 30 of FIG. 3 and the dual-core system 10 of FIG. 1 is only that: the sub processing core 30_Core1 of FIG. 3 has a function of directly accessing the memory 30_Mem; namely, a memory direct mapping technique is applied to the sub processing core 30_Core1; nevertheless, the sub processing core 10_Core1 of FIG. 1 has no such function, and only after the packet data is moved or copied to the user space 10_US1 via the memory copy method, the sub processing core 10_Core1 can perform the second processing to the packet stored in the user space 10_US1.

Figure 4:
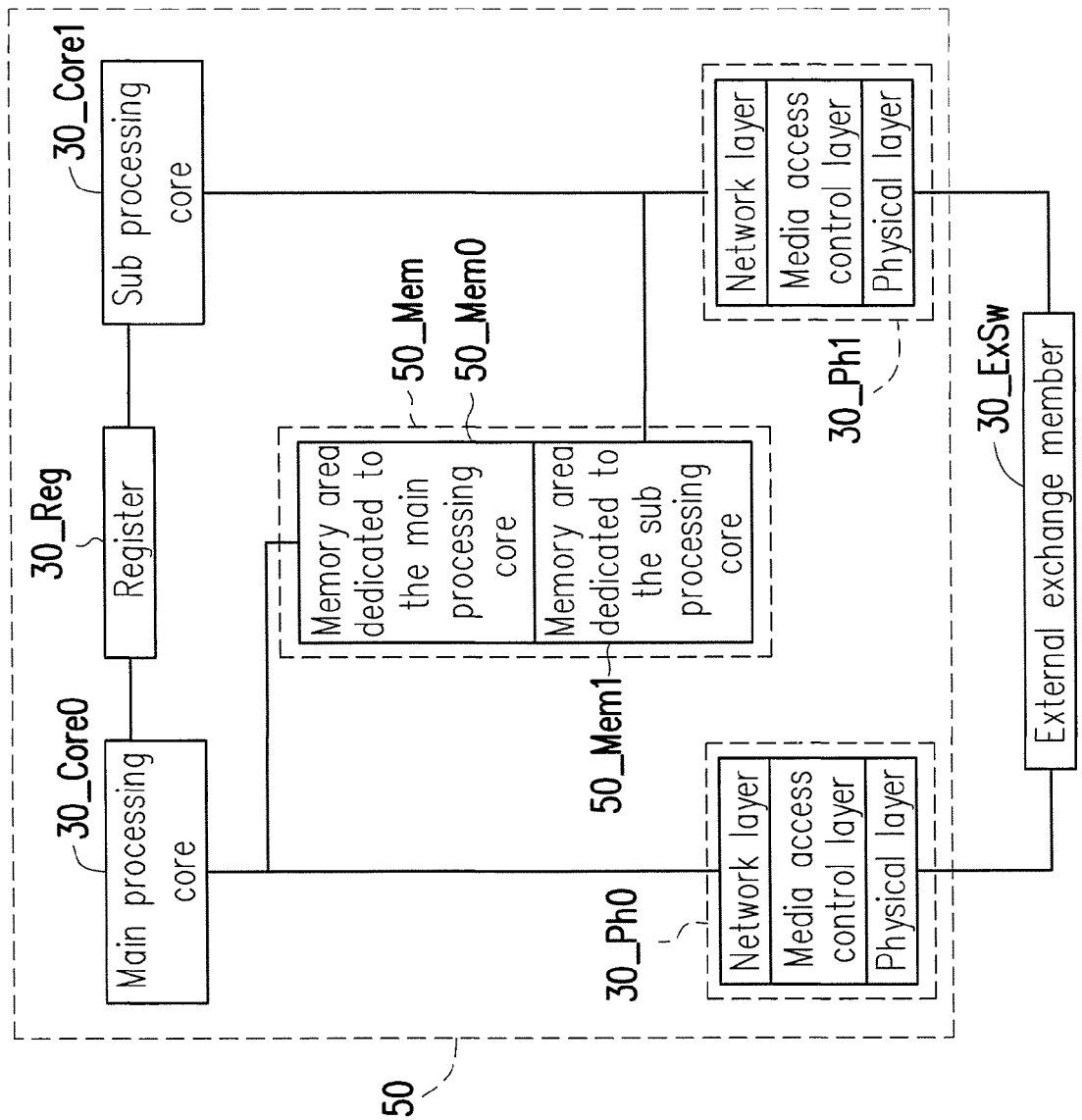
FIG. 4 is a block diagram of an asymmetric processing dual-core system according to another embodiment of the invention.

Next, referring to FIG. 4, FIG. 4 is a block diagram of an asymmetric processing dual-core system according to another embodiment of the invention. A difference between FIG. 4 and FIG. 3 is that, the memory 30_Mem of the dual-core system 30 in FIG. 3 has the shared memory area 30_MemS; nevertheless, a memory 50_Mem of a dual-core system 50 in FIG. 4 does not have a shared memory area. The sub processing core 30_Core1 also has a function of directly accessing the memory 50_Mem, but in this embodiment, the sub processing core 30_Core1 accesses the after first processing packet data within a memory area 50_Mem0 according to a memory absolute position. Under a circumstance of not considering a possibility of influencing the data of a core space 30_KS0 within the operating system of the main processing core 30_Core0, a performance of the dual-core system 50 in FIG. 4 is very similar to the performance of the dual-core system 30 in FIG. 3.

Figure 5:
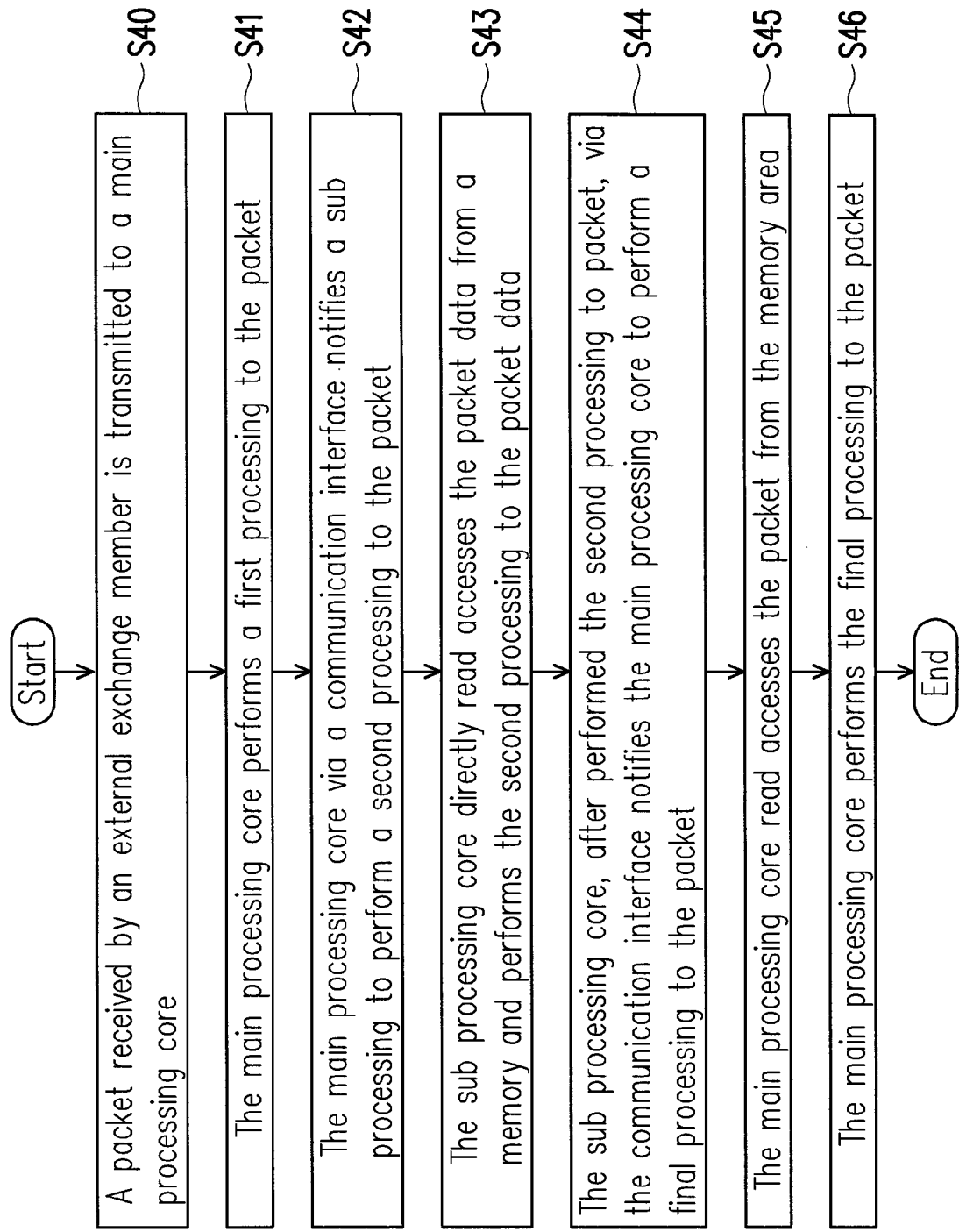
FIG. 5 is a flow diagram illustrating an approach of the collaboration of the dual-core system according to the embodiment of the invention.

Referring to FIG. 5, FIG. 5 is a flow diagram illustrating an approach of the collaboration of the dual-core system according to the embodiment of the invention. Firstly, at step S40, the external exchange member 30_ExSw via the first peripheral device 30_Ph0 transmits the received packet to the main processing core 30_Core0 to perform the first processing. Now, the packet data within the core space 30_KS0 of the operating system of the main processing core 30_Core0 is sent to the user space 30_US0, and furthermore, the packet data may be stored at the memory area 30_MemS of FIG. 3 (or the memory area 50_Mem0 of FIG. 4).

Next, as step S41, the main processing core 30_Core0 performs the first processing to the packet. Afterward, at step S42, the processing core 30_Core0 determines whether to let the sub processing core 30_Core1 to perform the second processing to the packet, and if yes, then the main processing core 30_Core0 via the communication interface (not shown in FIG. 3) notifies the sub processing core 30_Core1 to perform the second processing to the packet.

In step S43, the sub processing core 30_Core1 directly read accesses the packet data from the memory area 30_MemS (or the memory area 50_Mem0 of FIG. 4) and performs the second processing to the packet data. In more detail, the packet data within the memory area 30_MemS is not going to be copied or moved to the core space 30_KS1 of the operating system of the sub processing core 30_Core1, and the core space 30_KS1 does not have the packet data that may be copied or moved to the user space 30_US1 of the operating system of the sub processing core 30_Core1. In contrary, the sub processing core 30_Core1 read accesses the packet data within the memory area 30_MemS (or the memory area 50_Mem0 of FIG. 4) according to the memory absolute position and uses a storage space within the memory area 30_MemS (or the memory area 50_Mem0 in FIG. 4) for storing the packet data as a storage space within the user space 30_US1. In other words, the sub processing core 30_Core1 may directly read access all the data stored in the memory 30_Mem (or the memory 50_Mem in FIG. 4).

Next, at step S44, the sub processing core 30_Core1 performs the second processing to the after first processing packet data and via the communication interface notifies the main processing core 30_Core0 to perform the final processing to the packet. Afterward, at step S45, the main processing core 30_Core0 read accesses the after first processing packet data from the memory area 30_MemS. In more detail, the memory area 30_MemS (or the memory area 50_Mem0 of FIG. 4), is then copied or moved to the user space 30_US0 after the after first processing packet data is copied or moved to the core space 30_KS0. Finally, in step S46, the main processing core 30_Core0 performs the final processing to the after first processing packet.

Moreover, it is to explained that, in other embodiments, the main processing core 30_Core0, in the step S41, may not perform the first processing to the packet, and the main processing core 30_Core0, in the step S41, may also not perform the final processing to the packet. In other words, in other embodiments, the main processing core 30_Core0 may be only responsible for transmitting the packet to the external exchange member 30_ExSw and receiving the packet from the external exchange member 30_ExSw, and the sub processing core 30_Core1 is responsible for processing the packet.

Figure 6A:
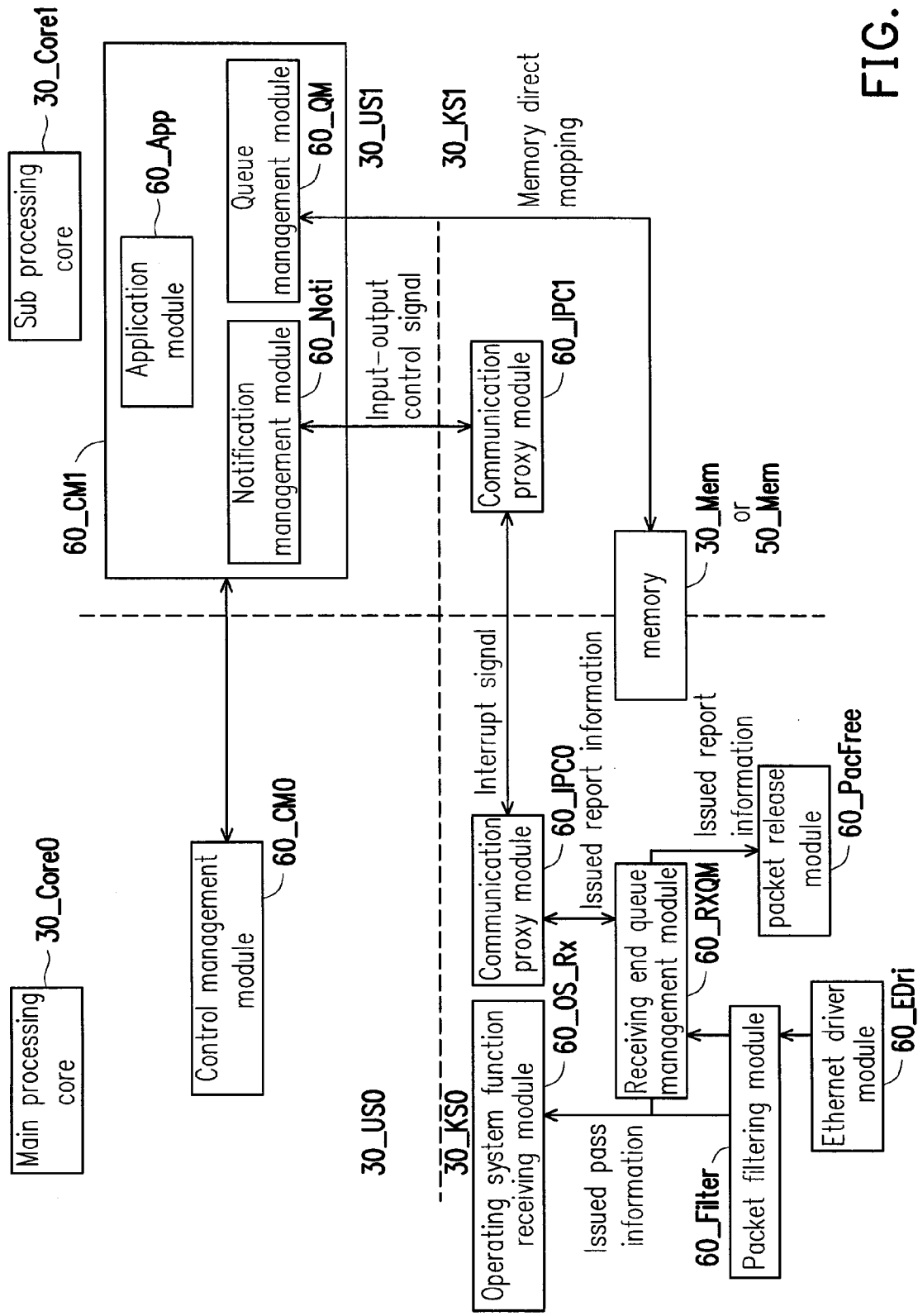
FIG. 6A is a schematic diagram illustrating a communication and a packet processing of a main processing core and a sub processing core according to the embodiment of the invention.
Figure 6B:
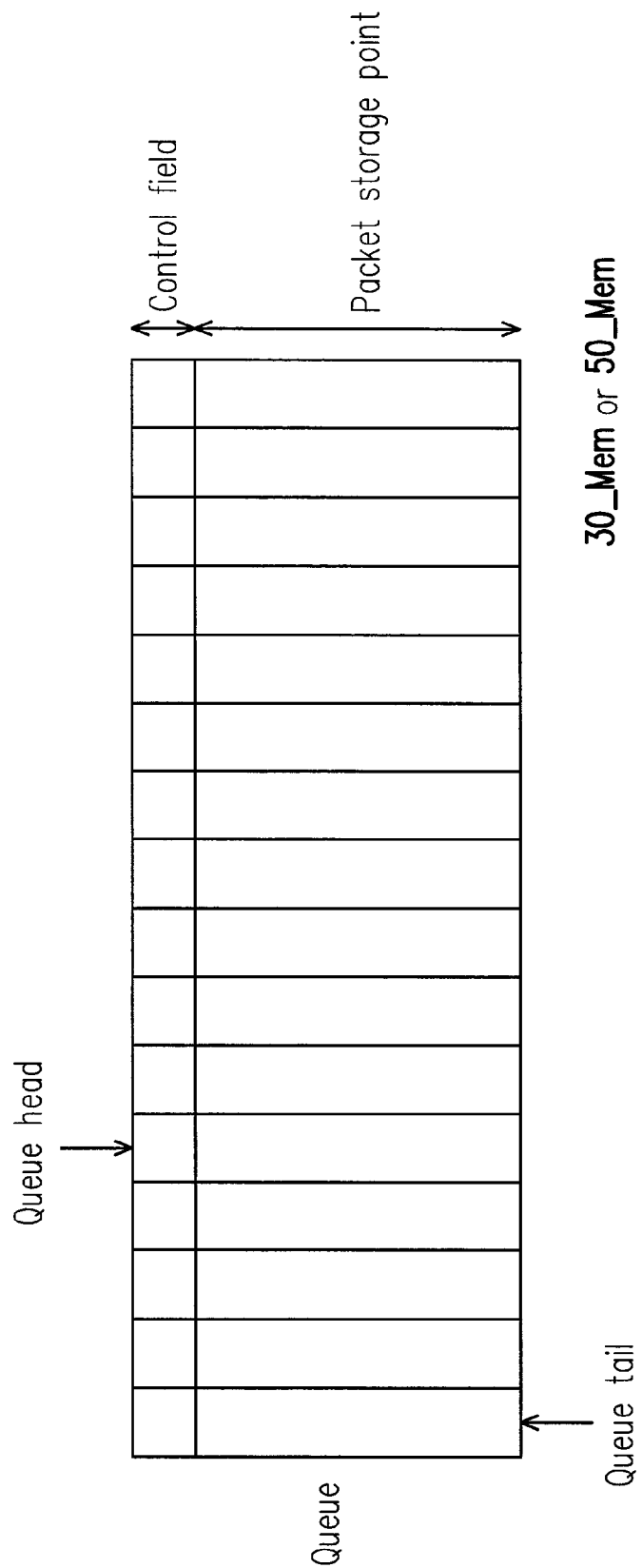
FIG. 6B is a schematic diagram illustrating a memory storage and queue method according to the embodiment of the invention.

Referring to FIG. 6A and FIG. 6B, FIG. 6A is a schematic diagram illustrating a communication and a packet processing of a main processing core and a sub processing core according to the embodiment of the invention, and FIG. 6B is a schematic diagram illustrating a memory storage and queue method according to the embodiment of the invention. The operating system of the main processing core 30_Core0, for example, is a Windows operating system, and this Windows operating system has the user space 30_USO and the core space 30_KS0. The operating system of the sub processing core 30_Corel, for example, is a Linux operating system, and this Linux operating system has the user space 30_US1 and the core space 30_KSI. The dual-core system 30 (or a dual-core system 50 in FIG. 4) includes modules realized by software-based codes, such as a control management modules 60_CM0, 60_CM1, an operating system function receiving module 60_OS Rx, a packet release module 60_PacFree, a communication proxy module 60_IPC0, a receiving end queue management module 60_RxQM, an Ethernet driver module 60_EDri, a communication notification proxy module 60_IPC1 and so forth.

The control management module 60_CM0 is a program executed by the user space 30_US0, and the operating system function receiving module 60_OS_Rx, the packet release module 60_PacFree, the communication proxy module 60_IPC0, the receiving end queue management module 60_RxQM and the Ethernet driver module 60_EDri are all programs executed by the core space 30_KS0. An application module 60_App, a notification management module 60_Noti and a queue management module 60_QM of the control management module 60_CM1 are all programs executed by the user space 30_US1, and the communication proxy module 60_IPC1 is a program executed by the core space 30_KS1.

The example in FIG. 6A is adapted to be used in the asymmetric processing dual-core system in FIG. 3 or FIG. 4, and therefore the memory of FIG. 6A may be the memory 30_Mem or 50_Mem. In FIG. 6A, the dual-core system 30 (or the dual-core system 50 of FIG. 4) further includes a packet filtering module 60_Filter located between the receiving end queue management module 60_RxQM and the Ethernet driver module 60_EDri. However, the packet filtering module 60_Filter, herein, is not a necessary module.

Firstly, the Ethernet driver module 60_EDri receives the packet from the network from the external exchange member 30_ExSw via the first peripheral device 30_Ph0. The packet filtering module 60_Filter analyzes the received packet so as to determine to send the packet to the receiving end queue management module 60_RxQM or to the operating system function receiving module 60_OS_Rx. If the packet is not required to be processed by the sub processing core 30_Core1, then the packet is sent by the packet filtering module 60_Filter to the operating system function receiving module 60_OS_Rx. If the packet requires to be processed by the sub processing core 30_Core1, then the packet is sent by the packet filtering module 60_Filter to the receiving end queue management module 60_RxQM.

The receiving end queue management module 60_RxQM is configured to manage the packet data stored within the memory 30_Mem or 50_Mem, stores the received packet in the packet queue in a First-In-First-Out (FIFO) manner and updates a queue head, wherein the memory area configured to store the packet data is substantially located at the core space 30_KS0 of the main processing core 30_Core0. Herein, the memory area configured to store the packet data may be the memory area 30_MemS of the memory 30_Mem or the memory area 50_Mem0 of the memory 50_Mem.

The queue management module 60_QM of the control management module 60_CM1 read accesses the queue using a polling method, and once a change in the queue head is found, it means that there is a new packet for the receiving end queue management module 60_RxQM to process. Then, the queue management module 60_QM uses the memory absolute position to read access the packet in the memory 30_Mem or 50_Mem, so that the sub processing core 30_Core1 performs the processing to the packet. In other words, the queue management module 60_QM does not copy or move the packet data within the memory 30_Mem or 50_Mem, the queue management module 60_QM may directly read access all the data in the memory 30_Mem or 50_Mem without copying or moving a large amount of data within the memory 30_Mem or 50_Mem.

The queue management module 60_QM, after finished read accessing, writes the processing result in a control field of the queue and updates a queue tail. The receiving end queue management module 60_RxQM may exam the queue tail with the polling method. When the receiving end queue management module 60_RxQM finds a value change of the queue tail, it means that the queue management module 60_QM has a processed packet, and the receiving end queue management module 60_RxQM may remove the processing result from the control field of the queue. Next, the receiving end queue management module 60_RxQM provides the packet to the operating system function receiving module 60_OS_Rx or the packet release module 60_PacFree according to the processing result. The invention may enable the main processing core 30_Core° and the sub processing core 30_Core1 to know when to process the packet and read access the data in the memory 30_Mem or 50_Mem using the polling method.

The packet release module 60_PacFree may instruct a buffer memory of the first peripheral device 30_Ph1 to discard the packet data according to an issued discard information. The operating system function receiving module 60_OS_Rx may perform other processing to the packet according to an issued pass information, so that the main processing core 30_Core0 calls the other process flows to continue a subsequent stage of processing or send out the processed packet.

In general, under a method of using the polling method in collaboration with the storage queue of FIG. 6B, the communication notification proxy modules 60_IPC0, 60_IPC1 of FIG. 6A are not the necessary modules. FIG. 6A and FIG. 6B are the embodiments illustrating the main processing core 30_Core0 and the sub processing core 30_Core1 using interrupt notifications to attain timely communications, so as to compensate an inadequacy of the polling. Because the packet to be processed by the sub processing core 30_Core1, the receiving end queue management module 60_RxQM sends out an issued notification information to the communication notification proxy module 60_IPC0 to instruct the communication notification proxy module 60_IPC0 to assist in the communication between the main processing core 30_Core0 and the sub processing core 30_Core1.

The communication notification proxy module 60_IPC0 sends out an interrupt signal according to an issued report information, the interrupt signal, for example, is a doorbell signal for the communication notification proxy module 60_IPC1 of the sub processing core 30_Core1. The communication notification proxy module 60_IPC1 generates an input-output control signal to the notification management module 60_Noti of the control management module 60_CM1 according to the interrupt signal.

The notification management module 60_Noti, after received the input-output control signal sent from the communication notification proxy module 60_IPC1, instructs the control management module 60_CM1 to turn on the queue management module 60_QM to enable the queue management module 60_QM to read access the packet in the memory 30_Mem or 50_Mem according to the memory absolute position, and next, enable the sub processing core 30_Core1 to process the packet.

After the sub processing core 30_Core1 processed the packet, a result of the packet is stored in the control field of the queue, the queue tail is updated, and the notification management module 60_Noti sends out the input-output control signal to the communication notification proxy module 60_IPC1 according to an instruction of the application module 60_App. The communication notification proxy module 60_IPC1 generates the interrupt signal to the communication notification proxy module 60_IPC0 according to the input-output control signal. The communication notification proxy module 60_IPC0 generates the issued report information to the receiving end queue management module 60_RXQM according to the interrupt signal to activate the receiving end queue management module 60_RXQM according to the processing result, so as to process the packet. In other words, through receiving the issued report information of the communication notification proxy module 60_IPC0, the receiving end queue management module 60_RXQM may timely exam the queue tail, thereby solving a waiting time problem due to the use of the polling method.

The aforementioned concept of applying the memory mapping direct technology to the sub processing core is not limited to the asymmetric processing dual-core system; in other words, the aforementioned processing method may also be applied to a symmetric processing multi-core system.

Figure 7:
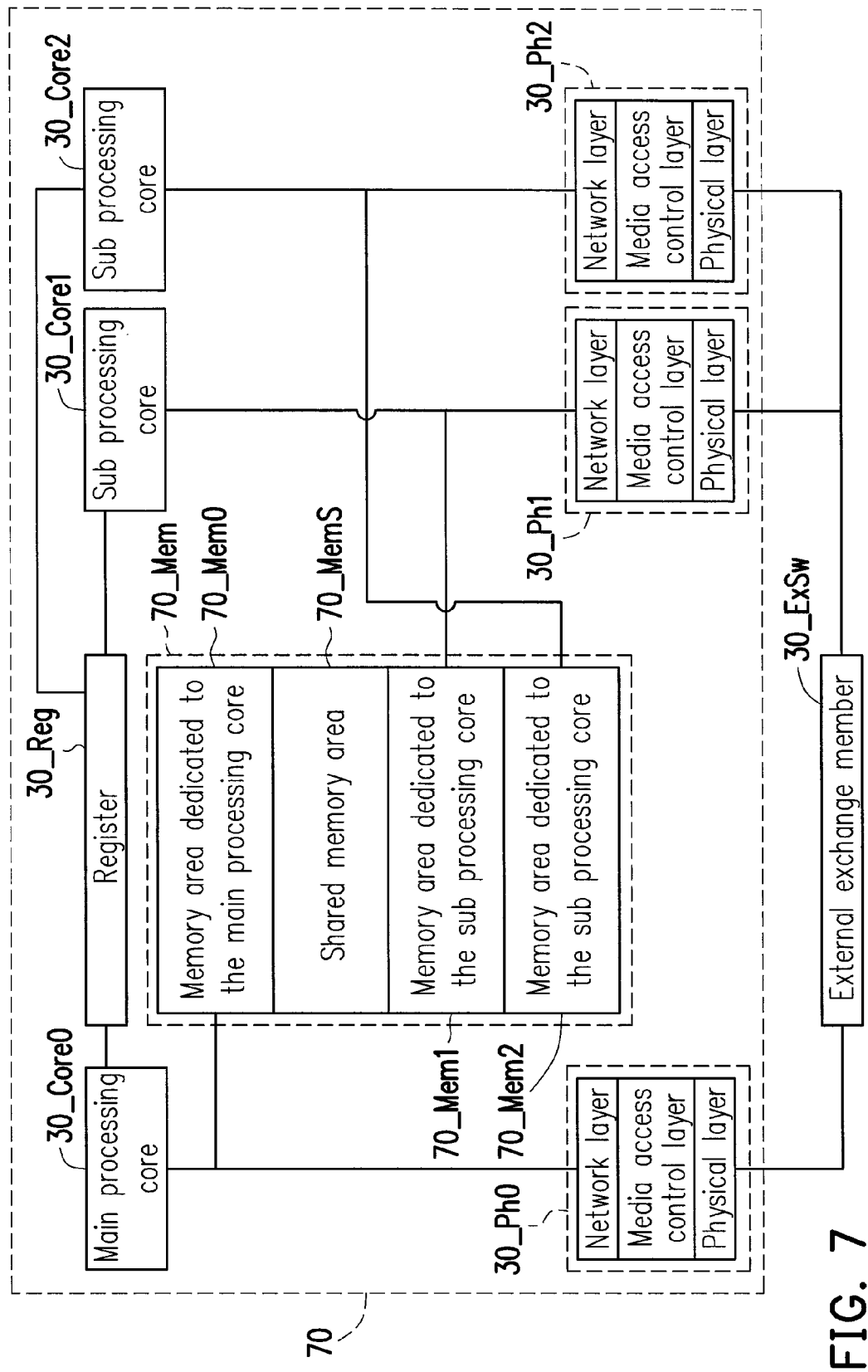
FIG. 7 is a block diagram of an asymmetrical processing multi-core system according to an embodiment of the invention.

Referring to FIG. 7, FIG. 7 is a block diagram of an asymmetrical processing multi-core system according to an embodiment of the invention. As compared to the dual-core system of FIG. 3, a multi-core system 70 of FIG. 7 further includes a sub processing core 30_Core2 and a third peripheral device 30_Ph2. In FIG. 7, a memory 70_Mem is divided into four memory areas 70_Mem0~70_Mem2 and 70_MemS, wherein the memory area 70_Mem0 is dedicated to the main processing core 30_Core0, the memory areas 70_Mem1 and 70_Mem2 are respectively dedicated to the sub processing core 30_Core1 and 30_Core2, and the memory area 70_MemS is shared by the main processing core 30_Core0, the sub processing cores 30_Core1 and 30_Core2.

The multi-core system 70 has two sub processing cores 30_Core1, 30_Core2, and when one of the sub processing cores is unable to facilely process in collaboration with the main processing core 30_Core0, the other sub processing core may process in collaboration with the main processing core 30_Core0, so as to attain the maximum performance of the asymmetrical processing multi-core system.

Figure 8:
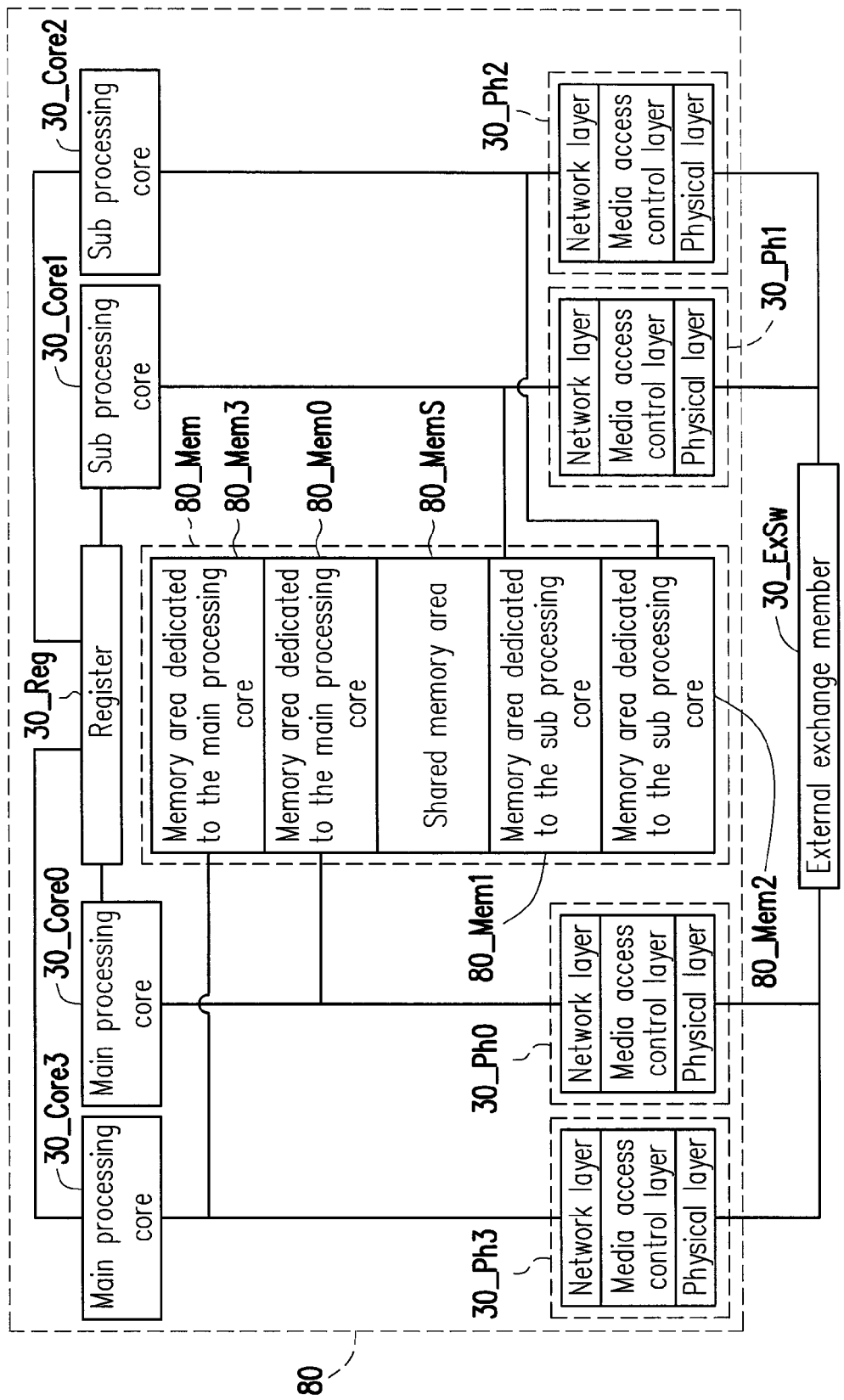
FIG. 8 is a block diagram of an asymmetrical processing multi-core system according to another embodiment of the invention.

FIG. 8 is a block diagram of an asymmetrical processing multi-core system according to another embodiment of the invention. As compare to the multi-core system 70 of FIG. 7, a multi-core system 80 of FIG. 8 further includes a main processing core 30_Core3 and a fourth peripheral device 30_Ph3, and a memory 80_Mem is divided into five memory areas 80_Mem0~80_Mem3 and 80 MemS, wherein the memory area 80_MemS is shared by the main processing cores 30_Core0, 30_Core3 and the sub processing cores 30_Core1 and 30_Core2, the memory areas 80_Mem0~80 Mem3 are respectively dedicated to the main processing core 30_Core0, the sub processing cores 30_Core1, 30_Core2 and the main processing core 30_Core3. Theoretically, a performance of the asymmetrical processing multi-core system 80 is superior to the asymmetrical processing multi-core system 70.

Moreover, the asymmetric processing dual-core system or the multi-core system provided in the aforementioned embodiments all may form a network device with the external exchange member, and thereby attain the maximum packet processing and packet transfer performances. This network device may be a mobile phone, a notebook computer, a desktop computer, a server or so forth.

In summary, the embodiments of the invention provide an asymmetrical processing multi-core system utilizable in the network device. The sub processing core within the asymmetrical processing multi-core system facilitates the main processing core in processing tasks, thereby improving the overall performance of the entire network device and causing the network device to operate more facilely. Different from the conventional processing method, the asymmetrical processing multi-core system does not require moving or copying a large amount of processed packet data, and thus a large amount of memory bandwidth is saved and the power consumption is reduced.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. An asymmetrical processing multi-core system comprising:

a main processing core having a first operation system, the first operation system comprising a first core space and a first user space, the first core space comprising an Ethernet driver module and a receiving end queue management module, the first user space comprising a first control management module;

a sub processing core having a second operation system, the second operation system comprising a second core space and a second user space, the second user space comprising a second control management module;

a register shared by the main processing core and the sub processing core;

a memory having a first memory area usable by the main processing core;

a first peripheral device connected to the main processing core and an external exchange member; and a second peripheral device connected to the sub processing core and the external exchange member;

wherein the Ethernet driver module receives a packet from the external exchange member via the first peripheral device, and the packet is stored by the receiving end queue management module at the first memory area; wherein the second control management module directly read accesses the packet data stored by the first memory area according to a memory absolute position and further processes the packet data to generate a processing result, and then the second control management module notifies the processing result to the receiving end queue management module; and the receiving end queue management module processes the packet according to the processing result, wherein the receiving end queue management module stores the received packet in a packet queue of the memory in a FIFO manner and updates a queue head, accordingly; wherein the second control management module has a queue management module read accessing the packet queue using a polling method, and if the queue management module finds a change in the queue head, then the queue management module uses the memory absolute position to directly read access the packet data stored by the first memory area, so as to enable the sub processing core to perform a process targeting the packet, wherein the first core space further comprises a first communication notification proxy module, the second core space further comprises a second communication notification proxy module; the receiving end queue management module sends out a first issued report information to the first communication notification proxy module; the first communication notification proxy module outputs a first interrupt signal to the second communication notification proxy module according to the first issued report information; the second communication notification proxy module outputs a first input-output control signal to the second control management module according the first interrupt signal; and after the second control management module received the first input-output control signal, the second control management module activates the queue management module, directly read accesses the packet data stored by the first memory area according to the memory absolute position, and performs the processing.

2. The asymmetrical processing multi-core system as recited in claim 1, wherein after the queue management module finished read accessing the packet queue, the queue management module writes the processing result in a control field of the packet queue and updates a queue tail of the packet queue.

3. The asymmetrical processing multi-core system as recited in claim 2, wherein the receiving end queue examines the queue tail using the polling method, and if the receiving end queue management module finds a value change of the queue tail, then the processing result is removed from the control field of the packet queue.

4. The asymmetrical processing multi-core system as recited in claim 1, wherein the first core space further comprises an operating system function receiving module and a packet release module; the receiving end queue management module provides the packet to the operating system function receiving module or the packet release module according to the processing result; the packet release module instructs a buffer memory of the first peripheral device to discard the packet data according to an issued discard information generated by the receiving end queue management module; the operating system function receiving module performs other processing to the packet according to an issued pass information generated by the receiving end queue management module, so that the main processing core calls up other processing to continue a subsequent stage of processing or send out the processed packet.

5. The asymmetrical processing multi-core system as recited in claim 1, wherein after the sub processing core finished processing the packet, the second control management module outputs a second input-output control signal to the second communication notification proxy module to inform the main processing core that the sub processing core has finished processing the packet; the second communication notification proxy module generates a second interrupt signal to the first communication notification proxy module according to the second input-output control signal; the first communication notification proxy module generates a second issued report information to the receiving end queue management module according to second interrupt signal, so as to activate the receiving end queue management module to process the packet according to the processing result.

6. The asymmetrical processing multi-core system as recited in claim 5, wherein the second control management module comprises an application module, a notification management module and a queue management module; the queue management module directly read accesses the packet data stored by the first memory area according to the memory absolute position; the notification management module sends out the second input-output control signal to the second communication notification proxy module according to an notification of the application module.

7. The asymmetrical processing multi-core system as recited in claim 4, wherein the first core space further comprises a packet filtering module; the packet filtering module receives the packet from the Ethernet driver module and determines to send the packet to the receiving end queue management module or the operating system function receiving module.

8. The asymmetrical processing multi-core system as recited in claim 1, wherein the first memory area is a memory area dedicated to the main processing core, or a memory area shared by the main processing core and the sub processing core.

9. A network device comprising an asymmetrical processing multi-core system and an external exchange member, the asymmetrical processing multi-core system comprising:

a main processing core having a first operation system, the first operation system comprising a first core space and a first user space, the first core space comprising an Ethernet driver module and a receiving end queue management module, the first user space comprising a first control management module;
a sub processing core having a second operation system, the second operation system comprising a second core space and a second user space, the second user space comprising a second control management module;
a register shared by the main processing core and the sub processing core;
a memory having a first memory area usable by the main processing core;
a first peripheral device connected to the main processing core and an external exchange member; and
a second peripheral device connected to the sub processing core and the external exchange member;
wherein the Ethernet driver module receives a packet from the external exchange member via the first peripheral device, and the packet is stored by the receiving end queue management module at the first memory area; wherein the second control management module directly read accesses the packet data stored by the first memory area according to a memory absolute position and further processes the packet data to generate a processing result, and then the second control management module notifies the processing result to the receiving end queue management module; and the receiving end queue management module processes the packet according to the processing result,
wherein the receiving end queue management module stores the received packet in a packet queue of the memory in a FIFO manner and updates a queue head, accordingly; wherein the second control management module has a queue management module read accessing the packet queue using a polling method, and if the queue management module finds a change in the queue head, then the queue management module uses the memory absolute position to directly read access the packet data stored by the first memory area, so as to enable the sub processing core to perform a process targeting the packet,
wherein the first core space further comprises a first communication notification proxy module, the second core space further comprises a second communication notification proxy module; the receiving end queue management module sends out a first issued report information to the first communication notification proxy module; the first communication notification proxy module outputs a first interrupt signal to the second communication notification proxy module according to the first issued report information; the second communication notification proxy module outputs a first input-output control signal to the second control management module according the first interrupt signal; and after the second control management module received the first input-output control signal, the second control management module activates the queue management module, directly read accesses the packet data stored by the first memory area according to the memory absolute position, and performs the processing.

10. The network device as recited in claim 9, wherein after the queue management module finished read accessing the packet queue, the queue management module writes the processing result in a control field of the packet queue and updates a queue tail of the packet queue.

11. The network device as recited in claim 10, wherein the receiving end queue examines the queue tail using the polling method, and if the receiving end queue management module finds a value change of the queue tail, then the processing result is removed from the control field of the packet queue.

12. The network device as recited in claim 9, wherein the first core space further comprises an operating system function receiving module and a packet release module; the receiving end queue management module provides the packet to the operating system function receiving module or the packet release module according to the processing result; the packet release module instructs a buffer memory of the first peripheral device to discard the packet data according to an issued discard information generated by the receiving end queue management module; the operating system function receiving module performs other processing to the packet according to an issued pass information generated by the receiving end queue management module, so that the main processing core calls up other processing to continue a subsequent stage of processing or send out the processed packet.

13. The network device as recited in claim 9, wherein after the sub processing core finished processing the packet, the second control management module outputs a second input-output control signal to the second communication notification proxy module to inform the main processing core that the sub processing core has finished processing the packet; the second communication notification proxy module generates a second interrupt signal to the first communication notification proxy module according to the second input-output control signal; the first communication notification proxy module generates a second issued report information to the receiving end queue management module according to second interrupt signal, so as to activate the receiving end queue management module to process the packet according to the processing result.

14. The network device as recited in claim 13, wherein the second control management module comprises an application module, a notification management module and a queue management module; the queue management module directly read accesses the packet data stored by the first memory area according to the memory absolute position; the notification management module sends out the second input-output control signal to the second communication notification proxy module according to an notification of the application module.

15. The network device as recited in claim 12, wherein the first core space further comprises a packet filtering module; the packet filtering module receives the packet from the Ethernet driver module and determines to send the packet to the receiving end queue management module or the operating system function receiving module.

16. The network device as recited in claim 9, wherein the first memory area is a memory area dedicated to the main processing core, or a memory area shared by the main processing core and the sub processing core.

* * * * *